United States Patent [19]

Ream et al.

[11] Patent Number: 5,318,784
[45] Date of Patent: Jun. 7, 1994

[54] POURABLE CHEWING GUM AND CONFECTION COMPOSITION

[75] Inventors: Ronald L. Ream, Plano; Christine L. Corriveau, Orland Park; Victoria L. Schlecht, Glen Ellyn, all of Ill.

[73] Assignee: Amurol Products Company, Naperville, Ill.

[21] Appl. No.: 942,261

[22] Filed: Sep. 9, 1992

[51] Int. Cl.⁵ ............................................. A23G 3/30
[52] U.S. Cl. ........................................ 426/5; 426/660; 426/104; 426/397
[58] Field of Search .......................... 426/3–6, 426/397, 660, 104

[56] References Cited

U.S. PATENT DOCUMENTS

| | | | |
|---|---|---|---|
| 2,290,120 | 7/1942 | Thomas | 426/5 |
| 3,062,662 | 11/1962 | McDonald | 426/5 |
| 3,205,075 | 9/1965 | Heggie et al. | 426/5 |
| 3,262,784 | 7/1966 | Bucher | 426/5 |
| 3,632,358 | 1/1972 | Echeandia et al. | 426/5 |
| 4,000,321 | 12/1976 | Mochizuki et al. | 426/5 |
| 4,139,589 | 2/1979 | Beringer et al. | 426/5 |
| 4,161,544 | 7/1979 | Kaul | 426/5 |
| 4,405,647 | 9/1983 | Fisher et al. | 426/5 |
| 4,491,596 | 1/1985 | Elias | 426/5 |
| 4,513,012 | 4/1985 | Carroll et al. | 426/5 |
| 4,753,805 | 6/1988 | Cherukuri et al. | 426/5 |
| 4,889,728 | 12/1989 | Maeda et al. | 426/5 |

*Primary Examiner*—Jeanette Hunter
*Attorney, Agent, or Firm*—Willian Brinks Hofer Gilson & Lione

[57] ABSTRACT

A chewing gum and confection composition is disclosed which is pourable and includes between about 30 and about 90 percent particles of chewing gum having an average particle size of between about 0.5 and 6 mm. The pourable composition also includes between about 10 and about 70 percent dry, flee-flowing, sweet confection. Preferably, the chewing gum particles are bits of bubble gum and the sweet confection is powdered dextrose. A method of making this pourable composition is also disclosed.

50 Claims, No Drawings

POURABLE CHEWING GUM AND CONFECTION COMPOSITION

BACKGROUND OF THE INVENTION

The present invention relates to the field of chewing gum, such as bubble gum, and confections. More particularly, the present invention relates to a combination and format for chewing gum and a dry, free-flowing sweet confection.

It is generally known that novel forms of chewing gum and confections are popular with consumers. Over the years, several novel chewing gum and/or confection productions have been introduced. These novel products have utilized various combinations of flavors, types, shapes, texture and or packaging to interest the consumer. One such product, sold under the name "DORKS," is described as bubble gum in particulate form packaged in and poured from a box.

Other novel products have combined chewing gum and a confection material. For example, the product described in U.S. Pat. No. 4,902,519 is commercially available under the name "Thumb Suckers." This product includes a hard candy sucker in an elastic mold with a bubble gum seal at the bottom of the mold. Another example is a product known as "Blow Pops" which include a mass of chewing gum surrounded by a hard candy sucker. Still another example is a product known as "Tidal Wave" which is a cube of chewing gum with a hollow center filled with a liquid confection. Yet another example is a chewing gum product known as "Cinnaburst" which includes small bits of hard candy dispersed within a mass of chewing gum.

SUMMARY OF THE INVENTION

Briefly stated, the composition aspect of the present invention is a pourable chewing gum and confection composition which includes particles of chewing gum and a dry, free-flowing sweet confection and a method of making such a pourable chewing gum and confection composition.

In accordance with the composition aspect of the invention, the particles of chewing gum have an average particle size of between about 0.5 and 6 mm. These particles of chewing gum comprise between about 30 about 90 percent of the composition. The composition also includes between about 10 and about 70 percent dry, flee-flowing, sweet confection, such as powdered dextrose.

In accordance with a preferred embodiment of the composition, the particles of chewing gum have an average particle size of about 3.2 mm and are present at about 60 percent. Also, in this preferred embodiment, the sweet confection is powdered dextrose with a flavoring agent added. This preferred embodiment further comprises an anticaking agent at about 1 percent of the sweet confection.

In accordance with the method aspect of the present invention, the novel pourable chewing gum and confection composition is made by forming chewing gum into particles with an average particle size between about 0.5 and about 6.0 mm. To the chewing gum particles is added a dry, flee-flowing, sweet confection. These two major ingredients are added so that the chewing gum particles are present in an amount between about 30 and about 90 percent, and the sweet confection is present in an amount between about 10 and about 70 percent.

One advantage of the present invention is the novelty of the composition. In particular, the present invention provides chewing gum and confection in a novel combination and format.

Another advantage is that this novel format is pourable. Aside from being novel, the fact that the composition is pourable allows it to be packaged and marketed in novel ways. For example, the pourable composition can be packaged in miniature bottles with screw-on lids. As a result, the product can be provided in a reclosable package. Also, a chewing gum and confection product in a miniature bottle is appealing to the consumer because of its play value.

Yet another advantage is that this novel pourable format also allows the customer to consume as much or as little of the composition as desired. In other words, since the product is not made into large pieces, the customer can consume as much as he likes. Also, if the container includes a screw-on lid, the remainder of the product is kept fresh until consumed later.

Still yet another advantage is that the combination of chewing gum with dry, free-flowing sweet confection allows for novel flavor combination experiences by the consumer. That is, the simultaneous ingestion of the chewing gum with its flavor profile and the sweet confection with its flavor profile allows for flavor profile combinations not previously possible.

It is noted that, as used herein, the term chewing gum is intended to have a relatively broad interpretation, including all forms of chewing gum such as bubble gum.

It is also noted that, unless indicated otherwise, particle sizes are given in terms of the maximum dimension of the particle. For example, the most preferred particles are rectangular blocks with average dimensions of 3.2 mm × 3.2 mm × 1.4 mm. As described in the specification and the appended claims, the average particle size of such particles is 3.2 mm.

It is further noted that, unless otherwise indicated, all percentages are given as percentages by weight of the composition.

The present invention, together with attendant objects and advantages, will be best understood with reference to the detailed description below.

DETAILED DESCRIPTION OF THE PREFERRED EMBODIMENTS

The first major ingredient of the composition of the present invention is the particles of chewing gum. It is believed that the type of chewing gum used is not critical to the invention, so long as it can be formed into particles of the requisite size. Preferably, the chewing gum is a film forming type gum, generally referred to as bubble gum. Typically, bubble gum can be made from a standard formulation of bulk sweetener, gum base, corn syrup, softening agents, coloring agents, and flavoring agents. Preferably, the bubble gum is made from 60-80 percent bulk sweetener, 15-30 percent corn syrup, 1-5 percent softeners, 0.1-3 percent flavoring agents, and 0.01-1 percent coloring agents. Most preferably, the formulation for the bubble gum is as follows:

| Ingredient | Weight Percent |
|---|---|
| Gum Base | 18.30 |
| Sugar | 67.72 |
| Softeners | 3.54 |
| Corn Syrup | 8.85 |
| Citric Acid | 0.73 |
| Coloring Agent | 0.11 |

-continued

| Ingredient | Weight Percent |
| --- | --- |
| Artificial Flavor | 0.75 |

The chewing gum of the present invention can be produced by conventional techniques using conventional equipment. In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets. Generally, the ingredients are mixed by adding the gum base to the running mixer. The base may also be melted in the mixer but does not have to be. Color and emulsifiers may also be added at this time. A softener such as glycerine may also be added at this time along with syrup and a portion of bulking agent. Further portions of the bulking agent may then be added to the mixer. A flavoring agent is typically added with the final portion of the bulking agent. The entire mixing procedure typically takes from five to twenty-five minutes, but longer mixing times may sometimes be required. Those skilled in the art will recognize that many variations of the above described procedure may be followed.

Preferably, the chewing gum used in the present invention will be one that is relatively nonhygroscopic. This has been found to be preferable in that it reduces the tendency of the composition to agglomerate during storage. Thus, sweeteners that readily absorb water, such as fructose and honey, should be avoided. Also, other ingredients, such as food acids, which can contribute hygroscopicity should also be limited.

The chewing gum can be formed into particles of the requisite size by any means, such as chopping, extrusion, slicing and/or scoring.

Preferably, the particles are formed by a method that can described as chipping. In accordance with this chipping method, a mass of chewing gum is made by conventional techniques. The mass of chewing gum is cured at ambient temperature for at least about 4 hours and then sheeted by conventional means to sheets which are about 1.4 mm thick, 248 mm wide and 425 mm long. As is customary in the chewing gum making art, the chewing gum is coated with a dusting agent during the sheeting process. Preferably, the dusting agent is selected from the group consisting of powdered sugar, corn starch, magnesium stearate, calcium stearate and combinations thereof. Most preferably, the dusting agent comprises corn starch.

Preferably, the sheets of chewing are then cooled to a temperature below about 18.3° C. and more preferably to a temperature between about 12.7° and about 18.3° C., most preferably to a temperature of about 14.4° C. It has been found that this cooling step improves the chipping process for the chewing gum. Also, the cooling step has been found to reduce the amount of powdered dextrose that is absorbed by the chewing gum over time when the two are mixed.

These cooled sheets are then passed through a chipping machine which has two chipper heads. Each chipper head is made up of a series of about 57 blades which are each about 57 mm in diameter and about 3.2 mm wide. Each chipper blade is spaced from the next blade by a spacer of the same width and with a reduced diameter. Each blade includes a series of ridges which protrude radially about 0.8 mm above the surface of the blade. The two chipping heads are arranged so that the blades of one head are lined up with the spacers of the other head. Also, the heads are arranged so that the blades are intermeshed. In other words, the blades of one head overlap with the blades of the other.

In operation, the chipping machine is set up so that the chipping heads are rotated in opposite directions and a sheet of the bubble gum is fed between the chipping heads. The rotation of the chipping heads pulls the sheet through and the intermesh of the blades shreds the sheet lengthwise in strips about 3.2 mm wide. Also, the ridges on each of the blades scores the strips of chewing gum at 3.2 mm intervals.

The scored shreds of chewing gum are then transferred to a ribbon blender wherein the shreds are more assuredly separated into individual pieces about 3.2 mm square. Typically, the shreds are blended for about 5 minutes. It is also preferable to add a dusting agent to the shreds in the ribbon blender. Adding the dusting agent to the ribbon blender coats the raw edges created during the separation process taking place in the ribbon blender, thus reducing the tendency toward agglomeration. Most preferably, corn starch is added to the shreds in the ribbon blender at about 7 percent by weight of the shreds.

As the chewing gum particles exit the ribbon blender, they are made to pass through a screen with openings slightly larger than 3.2 mm. After passing through the screen, the particles are set aside for filling into the container with the sweet confection.

As an alternative to using a separate chipping machine, a conventional sheeting machine can be modified to include scoring rolls with ridges designed to score the sheet at the desired intervals.

The average particle size of the chewing gum is between about 0.5 and about 6 mm. As noted above, the particle size is given as the maximum dimension of the particles. The particle size for the chewing gum is considered to be important because, if the particles are too large the composition is not pourable, and the chewing gum and sweet confection do not stay mixed well during storage. Also, if the particles are too small they become less perceptible by the consumer and become more difficult to come together as a cud.

Preferably the chewing gum particles have an average particle size between about 2 and about 4 mm. Most preferably, the particles have an average particle size of about 3.2 mm.

The shape of the chewing gum particles is not seen to be critical. As a product of the most preferred method of manufacture described above, the most preferred shape is a rectangular block which measures about 3.2 mm×3.2 mm×1.4 mm. Alternatively, other shapes such as spheres and irregular shapes can be used.

The second major ingredient of the composition of the present invention is the dry, free-flowing sweet confection. Preferably, the sweet confection comprises a carbohydrate sweetener selected from the group consisting of dextrose, sucrose and corn syrup solids together with combinations thereof. Most preferably, the sweet confection is crystalline dextrose. A suitable powdered dextrose is one such as that sold by A. E. Staley under the designation "Staleydex 333."

Alternatively, the sweet confection can be sweetened or enhanced through the use of a high potency sweetener such as aspartame, acesulfame K, sodium saccharine, sucralose, or the like. If used, such high potency sweeteners are preferably encapsulated or agglomerated to result in a delayed release when the sweet confection is consumed. Examples of agglomeration processes are described in U.S. Pat. Nos. 4,863,745 and 4,919,941, the entire disclosures of which are incorporated herein by reference.

Preferably, the sweet confection is in the form of a crystalline powder. Alternatively, the sweet confection can be in the form of a powder made from particles formed by agglomeration, spray drying or the like.

Preferably, the dry, free-flowing sweet confection also includes a flavoring agent. The flavoring agent can be chosen from a wide variety. Preferably, the flavoring agent will be in the form of a dry powder, for example a spray dried powder. Also, the flavoring agent will preferably be selected so as to compliment the flavor in the chewing gum. For example, if a fruit flavor is used in the chewing gum, the same fruit flavor or one having complimentary flavor notes can be added to the sweet confection. The level of flavoring agent added to the sweet confection depends on the agent used and the desired flavor effect. This level can readily be determined by those skilled in the art. In the most preferred embodiment, about 0.10 percent of a spray dried flavor, such as fruit punch, watermelon, or cherry, is added to the sweet confection.

A coloring agent is also preferably added to the sweet confection. The coloring agent can be selected so as to bring the color of the sweet confection closer to the color of the chewing gum particles. Alternatively, the coloring agent can be selected so as to make the sweet confection contrast in color with the color of the chewing gum particles. As with the level of flavoring agent, the selection of the coloring agent(s) used and the level at which they are used depends on the coloring agent(s) selected and the color effect to be achieved. Determining the optimum level is considered to be within the skill in this field. In the most preferred embodiment, about 0.25 percent of an aluminum lake colorant is used.

Another preferred ingredient of the composition of the present invention is an anticaking agent. Such compounds have been found to be useful in the present invention in preventing caking and/or agglomeration of the chewing gum particles and sweet confection during storage. Preferably, the anticaking agent is selected from the group consisting of starches, talc, silicas (precipitated silica), cellulose powders and combinations thereof. Most preferably, the anticaking agent is an alpha cellulose powder sold by James River Corp. as "Solka-Floc." When used, the anticaking agents are preferably present in an amount of between about 0.01 and about 12.0 percent, more preferably between about 0.25 and about 6 percent and most preferably at about 1.0 percent.

As with the formulation of the chewing gum particles, the formulation of the sweet confection should be relatively nonhygroscopic. Thus, ingredients, such as citric acid, which would make the sweet confection overly hygroscopic should be avoided or at least minimized.

The most preferable formula for the sweet confection is as follows:

| Ingredient | Weight Percent |
|---|---|
| Powdered Dextrose | 98.669 |
| Spray Dried Flavor | 0.099 |
| Aluminum Lake Colorant | 0.246 |
| Anticaking Alpha Cellulose Powder | 0.986 |

The relative amounts of the chewing gum particles and the sweet confection can vary according to the invention. The chewing gum particles should be present between about 30 and about 90 percent, with the range of about 50 to about 70 percent being more preferred and about 60 percent being most preferred. The sweet confection should be present between about 10 and about 70 percent, with the range of about 30 to about 50 percent being more preferred and about 40 percent being most preferred.

In the method aspect of the present invention, chewing gum is formed into particles with an average particle size between about 0.5 mm and about 6 mm. As mentioned above, these particles can be formed in various ways with the chipping process described above being most preferred.

Preferably, the ingredients of the dry, free-flowing confection are combined prior to addition of the particles of chewing gum. Most preferably, the coloring agent, flavoring agent and anticaking agent are all blended with crystalline dextrose before addition of the chewing gum particles.

The particles of chewing gum and the dry, free-flowing confection can be combined in various ways. Preferably, the two are combined during the packaging operation. Most preferably, to assure the optimum ratio of the two components, the chewing gum particles are added to the container in the appropriate amount first. Then the sweet confection is added. The containers are then closed and then vibrated to insure complete intermixing of the chewing gum particles with the sweet confection. It has been found most practical to fill a case with the individual containers and then shake the case with a conventional vibrating device, such as a paint can shaker.

Alternatively, the chewing gum particles and the sweet confection can be brought together and thoroughly mixed in conventional equipment before packaging.

Because of the novel pourable format, the composition can be packaged in creative ways. Most preferably, the composition is packaged in a miniature bottle with a screw-on lid. Such a miniature bottle can either be clear to allow the consumer to see the composition, or more preferably can be a bright color having some connection with the flavor of the composition.

As mentioned above, an advantage of the miniature bottle with a screw-on lid is that it is reclosable. In addition, the miniature bottle can be made with a relatively large opening for ease of pouring the composition out of the bottle. This large opening is also advantageous since the composition can have a tendency to agglomerate when it comes into contact with saliva from the consumer's mouth. Nevertheless, since the container has a large opening, the opening does not become clogged if this happens.

Another advantage of the miniature bottle is the play value it lends to the product. In other words, the bottle is fun for the consumer both during and after consumption of the product.

Alternatively, the composition can be packaged in a foil pouch, a box or other type of container.

EXAMPLES

The following examples are provided by way of explanation and illustration. As such, these examples are not to be viewed as limiting the scope of the invention as defined by the appended claims.

EXAMPLE 1

Example 1 was carried out according to the most preferred embodiment of the present invention. A bubble gum with the following formula is made up:

| Ingredient | Weight Percent |
| --- | --- |
| Gum Base | 18.3 |
| Powdered Sugar | 67.72 |
| Glycerine | 3.12 |
| Lecithin | 0.42 |
| Corn Syrup | 8.85 |
| Citric Acid | 0.73 |
| Red Coloring Agent | 0.11 |
| Artificial Flavor | 0.75 |

This bubble gum was made by the conventional method described above. The bubble gum was then cured, sheeted, and chipped as described above.

The dry free-flowing sweet confection was made with the following formula:

| Ingredient | Weight Percent |
| --- | --- |
| Powdered Dextrose | 98.669 |
| Spray Dried Flavor | 0.099 |
| Aluminum Lake Colorant | 0.246 |
| Anticaking Alpha Cellulose Powder | 0.986 |

The sweet confection was mixed by placing about one fourth of the powdered dextrose (Staleydex 333) in a blender with the flavor and the color. These ingredients were mixed for 2 to 3 minutes until the blend looked uniform. Next, the remainder of the dextrose and the alpha cellulose powder (Solka-Floc) are added and the composition is blended for another 4 to 4.5 minutes. The blend is then poured over a sifting screen with holes about 3.2 mm into barrels for later mixing with the bubble gum particles.

The bubble gum particles and the powdered dextrose composition filled into containers as described above.

EXAMPLE 2

Example 2 was carried out the same as Example 1 except that corn starch at about 6 percent by weight of the sweet confection was used as an anticaking agent in the place of alpha cellulose powder. The formulation of the sweet confection was thus as follows:

| Ingredient | Weight Percent |
| --- | --- |
| Powdered Dextrose | 93.63 |
| Spray Dried Flavor | 0.1 |
| Aluminum Lake Colorant | 0.25 |
| Corn Starch | 6.02 |

EXAMPLE 3

Example 3 was carried out the same as Example 1 except that silica, i.e. precipitated silica sold by PPG Ind. as "Flo-Gard SP", at a level of about 0.25 percent by weight of the sweet confection was used as an anticaking agent in the place of alpha cellulose powder.

The formulation of the sweet confection was thus as follows:

| Ingredient | Weight Percent |
| --- | --- |
| Powdered Dextrose | 99.4 |
| Spray Dried Flavor | 0.1 |
| Aluminum Lake Colorant | 0.25 |
| Silica | 0.25 |

It should be noted that although much of the discussion has involved the use of bubble gum as the chewing gum and powdered dextrose as the main ingredient of the dry, free-flowing sweet confection, other types of chewing gum and other types of dry, free-flowing sweet confections can be used. For example conventional chewing gum and powdered sucrose can be used. Certainly, these and all other modifications which are within the ordinary skill in the art to make are considered to lie within the scope of the invention as defined by the appended claims.

We claim:

1. A pourable chewing gum and confection composition comprising:
   between about 30 and about 90 percent particles of chewing gum product having an average particle size of between about 0.5 mm and about 6 mm; and between about 10 and about 70 percent dry, free-flowing, sweet confection in addition to the particles of chewing gum product.

2. The composition of claim 1 wherein the sweet confection comprises a sweetener selected from the group consisting of dextrose, sucrose, and corn syrups, and combinations thereof.

3. The composition of claim 1 wherein the sweet confection is crystalline.

4. The composition of claim 1 wherein the sweet confection includes a high-potency sweetener.

5. The composition of claim 4 wherein the high potency sweetener is selected from the group consisting of aspartame, acesulfame K, sodium saccharine, sucralose, as well as combinations thereof.

6. The composition of claim 4 wherein the high potency sweetener is treated for delayed release by encapsulation, agglomeration, or spray drying.

7. The composition of claim 1 wherein the sweet confection comprises a flavoring agent.

8. The composition of claim 7 wherein the flavoring agent is selected to compliment a flavoring agent in the chewing gum.

9. The composition of claim 1 wherein the sweet confection comprises a coloring agent.

10. The composition of claim 9 wherein the coloring agent is selected so as to match the color of the chewing gum particles.

11. The composition of claim 9 wherein the coloring agent is selected so as to contrast with the color of the chewing gum particles.

12. The composition of claim 1 further comprising an anticaking agent.

13. The composition of claim 12 wherein the anticaking agent is added between about 0.1 and about 12 percent by weight of the composition.

14. The composition of claim 12 wherein the anticaking agent is selected from the group consisting of starches, talc, silicas, cellulose powders, and combinations thereof.

15. The composition of claim 1 wherein the particles of chewing gum have an average particle size between about 2 and about 4 mm.

16. The composition of claim 1 wherein the particles of chewing gum have an average particle size of about 3.2 mm.

17. The composition of claim 1 wherein the particles of chewing gum are coated with a dusting agent.

18. The composition of claim 1 wherein the chewing gum particles are present in an amount between about 50 and about 70 percent and the sweet confection is present in an amount between about 30 and about 50 percent.

19. The composition of claim 1 wherein the chewing gum particles are present at about 60 percent and the sweet confection is present at about 40 percent.

20. The composition of claim 1 which is packaged in a miniature bottle.

21. The composition of claim 20 wherein the miniature bottle includes a screw-on lid.

22. A pourable chewing gum and confection composition comprising:
between about 50 and about 70 percent particles of chewing gum product having an average particle sizes of between about 2 mm and about 4 mm;
between about 30 and about 50 percent dry, free-flowing, powdered dextrose in addition to the particles of chewing gum product; and
between about 0.25 and about 6 percent of an anticaking agent in addition to the particles of chewing gum product.

23. The composition of claim 22 wherein a flavoring agent is added to the powdered dextrose.

24. The composition of claim 23 wherein the flavoring agent is selected to compliment a flavoring agent in the chewing gum.

25. The composition of claim 22 wherein a coloring agent is added to the powdered dextrose.

26. The composition of claim 25 wherein the coloring agent is selected so as to match the color of the chewing gum particles.

27. The composition of claim 25 wherein the coloring agent is selected so as to contrast with the color of the chewing gum particles.

28. The composition of claim 22 wherein the anticaking agent is selected from the group consisting of starches, talc, silicas, cellulose powders, and combinations thereof.

29. The composition of claim 22 wherein the particle of chewing gum have an average particle size of about 3.2 mm.

30. The composition of claim 22 wherein the particles of chewing gum are coated with a dusting agent.

31. The composition of claim 22 which is packaged in a miniature bottle.

32. A method of making a pourable chewing gum and confection composition comprising the steps of:
forming chewing gum product into particles with an average particle size between about 0.5 mm and about 6.0 mm;
separately forming a dry, free-flowing, sweet confection; and
forming a composition wherein said chewing gum particles are present in an amount between about 30 and about 90 percent, and said sweet confection is percent in an amount between about 10 and about 70 percent.

33. The method of claim 33 wherein the sweet confection comprises a sweetener selected from the group consisting of dextrose, sucrose, corn syrup solids, and combinations thereof.

34. The method of claim 33 wherein the sweet confection is crystalline.

35. The method of claim 33 wherein the sweet confection includes a high-potency sweetener.

36. The method of claim 35 wherein the high potency sweetener is selected from the group consisting of aspartame, acesulfame K, sodium saccharine, sucralose, as well as combinations thereof.

37. The method of claim 35 wherein the high potency sweetener is treated for delayed release by encapsulation, agglomeration, or spray drying.

38. The method of claim 32 further comprising the step of adding a flavoring agent to the sweet confection.

39. The method of claim 38 wherein the flavoring agent is selected to compliment a flavoring agent in the chewing gum.

40. The method of claim 32 further comprising the step of adding a coloring agent to the sweet confection.

41. The method of claim 40 wherein the coloring agent is selected so as to contrast with the color of the chewing gum particles.

42. The method of claim 32 further comprising the step of adding an anticaking agent.

43. The method of claim 42 wherein the anticaking agent is added between about 0.1 and about 12 percent by weight of the composition.

44. The method of claim 42 wherein the anticaking agent is selected from the group consisting of starches, talc, silicas, cellulose powders, and combinations thereof.

45. The method of claim 32 wherein the particles of chewing gum have an average particle size between about 2 and about 4 mm.

46. The method of claim 32 wherein the particle of chewing gum have an average particle size of about 3.2 mm.

47. The method of claim 32 further including the step of coating the chewing gum particles with a dusting agent before the sweet confection is added.

48. The method of claim 32 wherein the chewing gum particles are added in an amount between about 50 and about 70 percent and the sweet confection is added in an amount between about 30 and about 50 percent.

49. The method of claim 32 wherein the chewing gum particles are added at about 60 percent and the sweet confection is added at about 40 percent.

50. The method of claim 32 which is packaged in a miniature bottle.

* * * * *